United States Patent [19]

Quentin et al.

[11] 4,028,233

[45] June 7, 1977

[54] WATER PURIFICATION PROCESS

[75] Inventors: Karl-Ernst Quentin; Ludwig Weil, both of Munich; Harald Berger, Kelkheim, Taunus, all of Germany

[73] Assignee: Hoechst Aktiengesellschaft, Frankfurt am Main, Germany

[22] Filed: Mar. 7, 1975

[21] Appl. No.: 556,222

Related U.S. Application Data

[63] Continuation-in-part of Ser. No. 403,020, Oct. 3, 1973, abandoned.

[30] Foreign Application Priority Data

Oct. 5, 1972 Germany .................... 2248832

[52] U.S. Cl. .................... 210/28; 210/40; 210/52; 210/54; 210/DIG. 26
[51] Int. Cl.² .................... C02B 1/14
[58] Field of Search .................... 210/24, 39, 40, 42, 210/51–54, 59, DIG. 26, 28; 252/330, 358; 260/79.3 M, 94.9 GB

[56] References Cited

UNITED STATES PATENTS

| | | | |
|---|---|---|---|
| 3,215,623 | 11/1965 | Hix | 210/24 |
| 3,274,103 | 9/1966 | Adams | 210/23 |
| 3,485,752 | 12/1969 | Eck et al. | 210/54 |
| 3,520,806 | 7/1970 | Haigh | 210/40 |
| 3,557,017 | 1/1971 | Mange et al. | 252/358 |
| 3,644,303 | 2/1972 | Berger et al. | 260/79.3 M |
| 3,687,845 | 8/1972 | Treat et al. | 210/54 |
| 3,689,448 | 9/1972 | Berger et al. | 260/29.6 TA |
| 3,691,086 | 9/1972 | Lees et al. | 210/53 |
| 3,756,959 | 9/1973 | Vitalis et al. | 210/54 |
| 3,779,917 | 12/1973 | Norton et al. | 260/79.3 M |
| 3,852,490 | 12/1974 | Kolm | 210/24 |

*Primary Examiner*—Frank A. Spear, Jr.
*Assistant Examiner*—P. Hruskoci
*Attorney, Agent, or Firm*—Curtis, Morris & Safford

[57] ABSTRACT

Drinking water is prepared from crude water containing dissolved lypophilic contaminants by adding polymers of ethylene or substituted ethylenes or copolymers of ethylene with less than 50 % by weight of other ethylenically unsaturated monomers which may contain additionally less than 2 mole % of ethylenes carrying a carboxyl function, and separating the polymer substance containing the lipophilic contaminants.

3 Claims, No Drawings

WATER PURIFICATION PROCESS

The present application is a continuation-in-part application of U.S. patent application Ser. No. 403.020 filed Oct. 3, 1973 now abandoned.

The present invention relates to the manufacture of drinking water from crude water by removing low concentrations of dissolved lipophilic contaminants.

It is known to purify crude water by physical and chemical methods. Germs are deactivated by the action of chlorine or ozone and insoluble contaminants are eliminated by sedimentation, flocculation with aluminium sulfate or ferric chloride with subsequent filtration. The removal of lipophilic chlorinated hydrocarbons or other organic substances by oxidative processes is not satisfactory owing partly to the very high chemical resistance of the said substances. In water purification processes lipophilic contaminants are removed only partially by flocculation. If the concentration of the contaminants is low the degree of removal is considerably reduced as can be ascertained by sensitive methods. In the literature, statements can be found that certain chlorinated hydrocarbons used as insecticides, which have been detected in river water in concentrations of up to 30 ng/l, cannot be removed at all by conventional water purification processes.

This is the reason why adsorption methods using active carbon are often used. These processes have, however, considerable disadvantages, such as insufficient adsorption and selectivity, undesired biological effects, chemical and biological decomposition reactions during adsorption and hence the occurance of metabolites in the filtrate, and furthermore the requirement of large spaces and high investment costs for sufficiently efficient adsorption columns.

In German Offenlegungsschrift Pat. No. 1,517,465 hydrophilic polyelectrolytes consisting of copolymers of olefins having from 2 to 12 carbon atoms and unsaturated dicarboxylic acids of the maleic acid type or their functional derivatives, which copolymers contain at least one carboxyl function for each 2 to 7 carbon atoms in the chain, are recommended to remove or deactivate virus and/or remove surface active substances, i.e. hydrophilic contaminants. Copolymers of equimolecular amounts of a (substituted) olefin with unsaturated dicarboxylic acid are preferably used. The examples show mainly the equimolecular copolymer of styrene and maleic anhydride or the functional derivatives thereof and its effect on the removal on the tobacco mosaic virus. In the corresponding U.S. Pat. No. 3,398,092 it is also stated that copolymers of this type may also be used to remove other undesired substances.

In view of this state of the art it was very surprising that with highly hydrophobic polymers which do not contain carboxyl functions or contain only a few of such functions, excellent absorption results are obtained in the aqueous phase with lipophilic substances, especially at concentrations where the contaminants are completely dissolved in water.

It is known that waters can be seriously menaced by penetrating mineral oils. Although the contamination is not always harmful to health, the smell and taste of water contaminated by very small amounts of mineral oil is so obnoxious that it cannot be used as drinking water. The removal of these substances by known methods is difficult, often inadequate or even impossible.

The present invention provides a process for removing hydrocarbon or halogenated hydrocarbon contaminants dissolved in crude water in concentrations below 10 mg/l which comprises the steps of: (1) mixing the water with a polymer substance selected from the group consisting of
   a. a polymer of ethylene
   b. a polymer of substituted ethylene and
   c. a copolymer of ethylene and less than 50 % by weight of another ethylenically unsaturated monomer,
the aforesaid polymer substance containing 0.02 to 2 mole %, calculated on the monomer used, of ethylene carrying a carboxyl function, and having a particle size between 0,1 and 200 microns; (2) subjecting said crude water to a conventional flocculation procedure; either before, during or after the mixing with polymer substance and (3) separating the said polymer substance and flocculant formed in step (2) together with the contaminants, from said crude water.

In the process of the invention polymers containing 0.02 to 2 mole %, preferably 0,1 to 1 mole %, calculated on the monomers, of ethylene carrying a carboxyl function are used. By carboxyl functions are understood, inter alia, the carboxylic acid group itself (—COOH), the esters thereof (especially with $C_1$ to $C_4$ alcohols), —$CONH_2$, or $C_1$ to $C_4$-N-alkylated or -dialkylated derivatives thereof and the carbonitrile group (—CN). The polymers preferably contain the carbonamide and the carbonamide-sulfonic acid group or the alkali metal salts of the latter.

Especially suitable are pulverulent copolymers or copolymers in dispersion, free of foreign emulsifier and composed of 99,5 to 95 % by weight of ethylene structural units and 0,2 to 2,0 mole % of vinylacylamide structural units or 0,1 to 1,5 mole % of structural units of alkali metal salts of ethylenically unsaturated acylamide-N-sulfonic acids as described, for example, in German Offenlegungsschriften Pat. Nos. 1,720,667 and 1,812,413.

In the process of the invention the polymers are used, for example, in the form of dispersions, suspensions or powders. In a purification process to obtain drinking water, preparations free of emulsifiers are preferred. Especially preferred are powders still wet from their manufacture or aqueous dispersions or suspensions of copolymers in the chain of which an emulsifying component has been incorporated. The mean diameters of the polymer particles are generally between 0,1 and 200 microns, desireably between 0,1 and 100 microns and preferably between 0,2 and 10 microns.

Polymers of ethylene or substituted ethylenes or copolymers of the said compounds, can be used, particularly those manufactured from ethylene and less than 50 % by weight, preferably less than 10 % by weight of other ethylenically unsaturated monomers, for example olefins such as propylene, isobutylene, butadiene and vinyl chloride. Suitable monomers for preparing the copolymers of ethylene with less than 10 % by weight of other ethylenically unsaturated monomers are vinyl esters such as vinyl acetate, vinyl butyrate, vinyl benzote and particularly vinyl acetate; vinyl carboxylic acids such as acrylic acid, dimethylacrylic acid, methacrylic acids, crotonic acid, phenylacrylic acid, itaconic acid; vinylcarboxylic acid esters such as methylethyl-, propyl-, butyl-, octyl-, decyl-, and dodecylacrylates, methacrylates and crotonates; vinyl-carbocylic acid amides such as acrylamide, N-methylacrylamide, N-ethyl-acrylamide, N-propylacrylamide, N-isopropylacrylamide, N-butylacrylamide, as well as methacrylamide and the corresponding substituted methacrylamides; acrylamide and methacrylamide-N-sulfonic acids and the alkali metal salts thereof, preferably the sodium and potassium salts; and ethylene with aromatic substituents, such as styrene.

Lipophilic organic contaminants dissolved in crude water are generally mineral oils and pesticides. As mineral oils there are low molecular weight hydrocarbons, particularly those used as fuel in combustion engines, i.e. gasoline and Diesel oil, as well as the crude oil from which they are obtained, benzene and more viscous compounds suitable as lubricants.

Pesticides are biocidal compounds that are sparingly soluble in water, particularly halogenated, preferably chorinated, or nitrated paraffins, cycloparaffins, aromatic or polycyclic hydrocarbons, and include insecticidal chlorinated compounds such as p,p'-dichlorodiphenyl-trichloroethane, $\gamma$-hexachlorocyclohexane and similar compounds.

To carry out the process of the invention the polymer substance is added to the contaminated water while rapidly stirring and after a stirring period generally of from 3 to 30 minutes, preferably from 5 to 10 minutes, it is separated by a conventional method, for example by filtration or centrifugation, optionally with the addition of filtration aids. The amount of polymer substance required depends on the contamination of the water, in general it is in the range of from 2 to 100 mg/l, calculated on the solid polymer substance, preferably 4 to 60 mg/l, and still mor preferably 4 to 12 mg/l. Surface waters which are more strongly contaminated, for example river water, require a larger amount of absorbing polymer substance.

The temperatures required are generally the temperatures of surface water and ground water, i.e. in the range of about 0° to 30° C.

The process of the invention can be carried out either discontinuously or continuously. When crude water is to be purified for drinking purposes the process of the invention is preferably combined with a conventioned flocculation, for example by adding to the crude water aluminium sulfate or ferric chloride, optionally together with a commercial flocculation aid based on polyacrylamide or starch. In conventional flocculation processes sometimes larger and sometimes smaller proportions of lipophilic contaminants are removed. The degree of purification is generally insufficient, however, especially with water contaminated with mineral oil. Thus, it is hardly possible to reduce contaminant levels below about 500 $\mu$g/l which level still affects the taste of the water.

By combination of the process of the invention with a conventional flocculation, with addition of the polymer substance prior to, after, or during flocculation, preferably prior to flocculation, the lipophilic substances can be substantially, in many cases even quantitatively removed, that is to say to the limit of detectability. By the addition of the polymer substance, in many cases, the filtration performed after flocculation is facilitated. This mode of procedure has the advantage that it can be used in existing water purification units operated according to the flocculation process without substantial alterations being necessary. In such a conventional flocculation unit consisting of a mixing basin, flocculation basin and sedimentation basin, the contaminated water can first be subjected to chlorination in the mixing basin while vigorously stirring and then mixed with the polymer substance, the flocculating agent and the flocculation aid. In the flocculation basin the flakes are formed at a reduced stirring rate in the sedimentation basin, the flakes are separated from the clear water and by filtration over open rapid filters, drinking water is obtained.

As drinking water reserves becomes more and more scarce and the waters are more and more polluted, the process of the invention constitutes a considerable technical advantage, in that it allows purifying waters for drinking purposes which heretofore could not be purified. It is surprising that very small amounts of substances which are known to be hydrophobic bring about such favorable effects. This is shown by the following examples, which are not intended to limit the invention. In the examples the following polymers substances were used:

I. Ethylene-vinyl chloride copolymer as moist powder containing 20.8 % by weight of $H_2O$ and 17 % by weight of vinyl chloride units, calculated on solid matter; particle size below 3 microns;

II. Ethylene-2-ethylhexylacrylate-di-potassium-methacrylamide-N-sulfonate dispersion having a solids contents of 47 % by weight containing 7.4 % by weight of 2-ethylhexylacrylate and 3 % by weight of di-potassium-methacrylamide-N-sulfonate units, calculated on the solids content; particle size below 0,5 micron;

III. Polypropylene, dry powder, particle size below 50 micron;

IV. High density polyethylene, dry powder, particle size below 10 microns;

V. Polystyrene, dry pearls, particle size below 200 microns;

VI. Polyvinyl chloride, dry powder, particle size about 150 microns;

VII. Polyethylene dispersion containing 40 % by weight of polyethylene, emulsifier removed by dialysis against distilled water, particle size below 0,5 microns;

VIII. Polyethylene dispersion, 40 % by weight ethylene copolymer according to German Offenlegungsschrift 1,720,667 as dry substance, particle size below 0,5 micron;

IX. Polyethylene powder, 50 % by weight dry substance, obtained by acid precipitation according to German Offenlegungsschrift Pat. No. 1,812,413 of dispersion VIII, particle size below 3 microns.

The following examples illustrate the invention.

EXAMPLE 1

7,3 mg of n-decane (p.a.) were added to 1 liter of tap water of Munich. After intense mixing for 10 minutes 50 mg of polymer substance I, calculated on dry matter, were added and intensive stirring was continued for a further 5 minutes. Then, 20 mg of aluminium sulfate, in the form of a 5 % aqueous solution was added as flocculation agent and then 0,2 mg of a commercial flocculation aid based on polyacrylamide were added and the mixture was stirred for 10 minutes more. After standing for about 3 hours, the Al(OH)$_3$ flakes and the polymer substance were filtered off through pleated filters and the hydrocarbon concentration in the clear filtrate was determined by IR spectrometry as described in "Deutsche Einheitsverfahren zur Wasseruntersuchung" Verlag Chemie, Weinheim (Bergstrabe; Federal Republic of Germany) 1960, with the aid of a standard mixture (isooctane, cetane, benzene) according to "Manual on Disposal of Refinery Wastes", volume IV, AP I, New York (1957).

The results of these and further tests carried out in the same manner with different polymer substances and hydrocarbon types are summarized in the following Table I.

TABLE I

| Example No. | hydrocarbon 7,3 mg/l | polymer substance type | concentration | final contamination μg hydrocarbon / 1 water |
|---|---|---|---|---|
| 1 | n-decane | I | 50 mg/l | 210 |
| 2 | n-decane | II | 20 mg/l | 300 |
| 3 | n-decane | — | — | 600 |
| 4 | Diesel oil | III | 50 mg/l | 210 |
| 5 | Diesel oil | IV | 50 mg/l | 100 |
| 6 | Diesel oil | — | — | 720 |
| 7 | standard gasoline | V | 50 mg/l | 50 |
| 8 | standard gasoline | VI | 50 mg/l | 150 |
| 9 | standard gasoline | — | — | 530 |

When comparing the tests using the polymer substance with the normal flocculation tests (3,6, and 9) the efficiency of the polymers become clearly evident. The organoleptic limit of determination for mineral oils is about 500 μg/l.

EXAMPLE 10

In a beaker 1 μg γ-hexachlorocyclohexane in the form of an acetonic solution containing 10 μg of γ-hexachlorocyclohexane per ml of acetone was added to 1 liter of water (pH 7,5) while rapidly stirring. Then, 20 mg of the polyethylene dispersion VIII (prediluted with water in a ratio of 1 : 10), followed by 50 mg of aluminum sulfate in the form of a 5 % aqueous solution and 2 mg of a commercial flocculating aid based on polyacrylamide were added. The mixture was stirred at reduced speed for a further 5 minutes. After sedimentation for 5 minutes the mixture was filtered through a pleated filter and the clear filtrate was analyzed as to its content of γ-hexachlorocyclohexane (by the method described by L. Weil and K.-E. Quentin "Zur Analytik der Pestizide in Wasser" gwf wasser: abwasser 112 (1971), pages 184 and 185).

In analogous manner tests were carried out to examine the degree of separation of the following frequently used pesticides depending on the amount of polyethylene dispersion VIII used:

A. γ-hexachlorocyclohexane
B. 1,4,5,6,7,8,8-heptachloro-2,3-epoxy-3a,4,7,7a-tetrahydro-4,7-methanoidene
C. 1,2,3,4,10,10-hexachloro-6,7-epoxy-1,4,4a,5,6,7,8,8a-octahydro-1,4-endo-5,8-exo-dimethano-naphthalene
D. p,p'-dichlorodiphenyl-trichloroethane
E. p,p'-dimethoxy-diphenyl-trichloroethane The results summarized in Table II were obtained.

TABLE II

| pesticide | polyethylene (dispersion VIII) | | | |
|---|---|---|---|---|
| | 0 | 10 | 20 | 100 mg/l |
| | % separation of pesticide | | | |
| A | 10 | 20 | 26 | 76 |
| B | 20 | 33 | 45 | 97 |
| C | 37 | 60 | 70 | 100*) |
| D | 96 | 100*) | 100*) | 100*) |
| E | 99 | 100*) | 100*) | 100*) |

*)the pesticide concentration in the filtrate was below 0,001 /μg per liter, i.e. below the limit of detectability.

EXAMPLE 11

In the manner described in Example 1, 55 mg/l of n-decane were added to the tap water (the amount forming a saturated solution) and flocculation was brought about. A clear filtrate was obtained. When the flocculation was carried out without polymer addition the water contained from 400 to 1,200 μg/l of n-decane after the treatment. With the addition of 10 mg/l of polyethylene dispersion VIII the content of n-decane was reduced to 30 to 70 μg/l after flocculation and filtration.

EXAMPLE 12

In the manner described in Example 1 water contaminated with 10 mg/l of n-decane was subjected to flocculation with the addition of 8 mg/l of polyethylene powder IX. A clear filtrate was obtained having a decane content of 50 μg/l, corresponding to a degree of purification of 99,5 %.

EXAMPLE 13

In the manner described in Example 10, water contaminated with 10 μg/l of compound C was treated with 20 mg/l of aluminum sulfate and 0,1 mg/l of a commercial flocculation aid based upon starch with the addition of 8 mg/l of polyethylene powder IX. The content of compound C in the clear filtrate was 0,18 μg/l, corresponding to a degree of separation of 98,2 %.

EXAMPLE 14

In the manner described in Example 10, water (pH 6,3) contaminated with 10 μg/l of compound D was treated with 6 mg of polyethylene powder IX, 30 mg/l of Fe(Cl)$_2$ in the form of a 10 % aqueous solution, 30 mg/l of a Ca(OH)$_2$ in the form of a 5 % milk of lime and 0,23 mg/l of a commercial flocculation aid based on starch. The clear filtrate contained 0,002 μg/l of compound D, corresponding to a degree of separation of 99,98 %.

We claim:

1. In a process for preparing drinking water by removing hydrocarbon or halogenated hydrocarbon contaminants dissolved in water in a concentration below 10 mg/l, wherein an aluminum or iron salt and a flocculation aid selected from the group consisting of polyacrylamide and starch is added to the water and the floc thus formed together with contaminants is separated from the water, the improvement which comprises mixing the water with a pulverulent copolymer composed of from 99.5 to 95% by weight of ethylene structural units and of from 0.2 to 2.0 mole % of vinylacylamide structural units and having a particle size between 0.1 and 200 microns, in an amount of from 2 to 100 mg/l of water to be treated, before, during or after the addition of the aluminum or iron salt, said copolymer being introduced together with said flocculation aid to the water, and separating said polymer substance together with said floc and contaminants from the water.

2. In a process for preparing drinking water by removing hydrocarbon or halogenated contaminants dissolved in water in a concentration below 10 mg/l, wherein an aluminum or iron salt and a flocculation aid selected from the group consisting of polyacrylamide and starch is added to the water and the floc thus formed together with contaminants is separated from the water, the improvement which comprises mixing the water with a pulverulent copolymer composed of from 99.5 to 95% by weight of ethylene structural units and from 0.1 to 1.5 mole % of structural units of an alkali metal salt of an ethylenically unsaturated acylamido-N-sulfonic acid and having a particle size between 0.1 and 200 microns in an amount of from 2 to 100 mg/l of water to be treated, before, during or after the addition of the aluminum or iron salt, said copolymer being introduced together with said flocculation aid to the water, and separating said polymer substance together with said floc and contanimants from the water.

3. In a process for preparing drinking water by removing hydrocarbon or halogenated hydrocarbon contaminants dissolved in water in a concentration below 10 mg/l, wherein an aluminum or iron salt and a flocculation aid selected from the group consisting of polyacrylamide and starch is added to the water and the floc thus formed together with contaminants is separated from the water, the improvement which comprises mixing the water with a copolymer in a dispersion free of emulsifier, said copolymer being composed of from 99.5 to 95 % by weight of ethylene structural units and of from 0.1 to 1.5 mole % of structural units of an alkali metal salt of an ethylenically unsaturated acylamido-N-sulfonic acid and having a particle size between 0.1 and 200 microns in an amount of from 2 to 100 mg/l, calculated on the solid polymer substance, of water to be treated, before, during or after the addition of the aluminum or iron salt, said copolymer being introduced together with said flocculation aid to the water, and separating said polymer substance together with said floc and contaminants from the water.

* * * * *